2,748,103

COPOLYMERS OF VINYL ESTERS WITH N-ALLYL URETHANES AND HYDROLYSIS PRODUCTS THEREOF

William J. Priest, Rochester, N. Y., assignor to Eastman Kodak Company, Rochester, N. Y., a corporation of New Jersey No Drawing. Application June 10, 1952,
Serial No. 292,717

8 Claims. (Cl. 260—77.5)

This invention relates to copolymers of vinyl carboxylic esters and N-allyl urethanes, and to hydrolysis products thereof.

Polyvinyl compounds containing hydroxyl groups such as, for example, polyvinyl alcohol, have been used previously for the production of various shaped articles such as films, tubings, plastic compositions, etc. However, the products made from such polymers in their original unmodified forms have had only limited utility, because of their relative high susceptibilities to water. Various proposals have been put forth to decrease the water susceptibility, particularly of materials made from polyvinyl alcohol, for example, by treating polyvinyl alcohol with insolubilizing agents such as formaldehyde, ethylene oxide, dimethylol urea, etc., or by incorporating therewith various water insoluble, compatible agents. While these proposals have resulted in satisfactory materials for certain specific applications, in others, certain deficiencies have been noted.

We have now found that certain copolymers of vinyl carboxylic esters and a relatively small amount of N-allyl urethanes, on hydrolysis, give polymeric products similar to hypothetical copolymers of vinyl alcohol and allylamine. My new hydrolyzed copolymers are essentially similar in most properties to polyvinyl alcohol. However, they have the important advantage that they may be treated under relatively mild conditions to produce cross linkage and thereby effecting insolubility in all solvents. The reactive amine groups produced in the hydrolysis reaction may also be used as loci for reaction in the preparation of other derivatives consisting principally of polyvinyl alcohol.

It is, accordingly, an object of the invention to provide certain copolymers of vinyl carboxylic esters and N-allyl urethanes. Another object is to provide hydrolyzed products of certain copolymers of vinyl carboxylic esters and N-allyl urethanes. Another object is to provide methods for preparing the same. Other objects will become apparent hereinafter.

In accordance with the invention, I first prepare copolymers of vinyl carboxylic esters and N-allyl urethanes by heating a mixture of from about 95.0 to 99.9 per cent by weight of a vinyl carboxylate, wherein the carboxylate group is the radical of a saturated fatty acid containing from 2 to 4 carbon atoms (e. g. vinyl acetate, vinyl n-propionate, vinyl n-butyrate, etc.), and from 5.0 to 0.1 per cent by weight of an N-allyl urethane having the general formula:

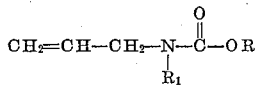

wherein R represents an alkyl group containing from 1 to 4 carbon atoms, a phenyl group or a naphthyl group, and $R_1$ represents an atom of hydrogen, an alkyl group containing from 1 to 4 carbon atoms, a phenyl group or a naphthyl group, in the presence of a polymerization catalyst, until the polymerization is substantially complete, and then hydrolyze the copolymer obtaining thereby a copolymeric product which is essentially a copolymer containing from 0.1 to 5.0 per cent by weight of allylamine, the remainder being substantially vinyl alcohol. Preferably the hydrolysis is carried out in two separate hydrolysis steps to avoid byproduct contamination which can be removed only with great difficulty. The first step of the hydrolysis is carried out by treating the copolymer of the vinyl carboxylate and the N-allyl urethane with a small quantity of alcoholic alkali metal hydroxide which causes an ester interchange and gelation to take place so that the resultant product is essentially a copolymer of from about 90.0 to 99.8 per cent by weight of vinyl alcohol and from about 10.0 to 0.2 per cent by weight of N-allyl urethane, N-allyl carbamic acid or salt thereof. The temperature of hydrolysis is not critical in this step. The partially hydrolyzed polymer, after isolation and purification, is then subjected to the final and more drastic hydrolysis step, to convert the carbamic acid or any residual urethane groups to amine groups, comprising heating the polymer in a 1 to 3 per cent aqueous sodium hydroxide, at from 40°–100° C., until the hydrolysis is substantially complete, followed by dialysis, if desired, and isolation of the resultant polymeric product. Preferably the starting copolymer is a copolymer of vinyl acetate and N-allyl urethane.

Suitable N-allyl urethanes include N-allyl methylurethane, N-allyl urethane, N-allyl, n-propylurethane, N-allyl isopropylurethane, N-allyl n-butylurethane, N-allyl sec-butylurethane, N-allyl phenylurethane, N-allyl naphthylurethanes and the corresponding N-allyl—N-alkyl urethanes wherein the N-alkyl group contains from 1 to 4 carbon atoms (e. g. methyl, ethyl, n-propyl, isopropyl, n-butyl, etc. groups). The above kind of N-allyl urethanes can be readily prepared by reacting allylamine or N-alkyl allylamines, wherein the N-alkyl group contains from 1 to 4 carbon atoms, with at least an equivalent amount of a chloroformic acid ester wherein the ester group is an alkyl group containing from 1 to 4 carbon atoms, a phenyl group or a naphthyl group, and separating the N-allyl urethane, which forms, from the reaction mixture.

The copolymerizations for preparing the copolymers of the invention can be carried out at reduced or increased pressures, but preferably at normal atmospheric pressures, in mass, in suspension or in emulsion processes, and are accelerated by heat, actinic light and polymerization catalysts. Typical catalysts which are useful include the organic and inorganic peroxides such as hydrogen peroxide, benzoyl peroxide, acetyl peroxide, lauroyl peroxide, etc., persulfates such as ammonium, sodium or potassium persulfates, etc., perborates such as ammoinum, sodium or potassium perborates, etc., percarbonates, etc. For polymerizations occurring in the oil phase, an oil-soluble polymerization catalyst such as a diacyl peroxide is suitable. For aqueous emulsion polymerization, a water-soluble catalyst such as potassium persulfate is preferred and an activating agent such as an alkali metal bisulfite can be added, if desired. In certain cases a chain regulator such as an alkyl mercaptan can also be used with advantage. The catalyst can be added all at once or in portions. Mixtures of catalysts can be employed. The amount of the polymerization catalyst and activating agent can be varied from about 0.01 to 5.0 per cent, based on the weight of monomers. The proportion of vinyl carboxylate and N-allyl urethane in the copolymeric products is approximately the same as the proportions of monomers used in the starting polymerization mixtures. The temperature of the copolymerizations can vary from about 30° to 100° C., or more, but preferably from 30° to 60° C.

For dispersion or emulsion polymerizations, a dispersing or emulsifying agent is preferably added to the polymerization mixture such as alkali metal salts of fatty alcohol sulfates (e. g. sodium cetyl sulfate, sodium lauryl sulfate, etc.), alkali metal salts of aromatic sulfonic acids (e. g. sodium or potassium isobutyl naphthalene sulfonate, etc.), sulfosuccinic acid esters, their alkali metal salts or amine addition salts, alkali metal salts of fatty acids containing from 12 to 20 carbon atoms, sulfonated fatty acid amides or their alkali metal salts, and the like. The emulsifying agents are used in relatively small amounts not exceeding about 2 per cent, based on the total weight of monomers. The ratio of water to the monomers can vary by weight from about 10: to 2:1, but preferably from 10:1 to 5:1.

The following example will serve to illustrate further the polymeric products of the invention, and the manner of their preparation.

*Example*

A mixture of 75 parts by weight of vinyl acetate, 3 parts by weight of N-allyl urethane and 0.3 parts by weight of benzoyl peroxide was heated at 50° C. for 16 hours, and then an additional 0.2 parts by weight of benzoyl peroxide was added and the mixture heated for 24 hours longer. The colorless copolymer obtained was found to contain approximately 3.8% by weight of N-allyl urethane and 96.2% by weight of vinyl acetate. It was taken up in methanol and to the solution was added a small quantity of 10% methanolic sodium hydroxide. After gelation, this mixture was allowed to stand for one day. It was then taken up in water and precipitated in ethyl alcohol, washed in acetone and air dried at 35°–40° C. The analysis showed that substantially all of the acetyl groups had been converted to hydroxyl groups, while the N-allyl urethane represented by a nitrogen content of 0.9 per cent by weight was unaffected by the hydrolysis treatment. The polymer, therefore, was essentially a copolymer of about 92 per cent by weight of vinyl alcohol and about 8 per cent by weight of N-allyl urethane.

6 parts by weight of the above hydrolyzed and purified copolymer were dissolved in 120 parts by weight of water. 20 parts of this solution were withdrawn and preserved as a control. In the balance of the solution were dissolved 1.06 parts by weight of sodium hydroxide. The solution was heated to and maintained at 60° C. A sample was withdrawn after one day of heating, neutralized and then dialyzed against running tap water for one week. The dialyzed sample, electrometrically titrated, showed an amine content calculated as allylamine of approximately 1 per cent by weight, assuming that no polymer was lost in the dialysis procedure. The sample, mixed with one part of 5 per cent formaldehyde, and adjusted to a pH of 6 was coated on a glass plate. After one week, the coating was substantially insoluble in boiling water.

In place of the N-allyl urethane in the above example, there can be substituted an equivalent amount of any of the other mentioned N-allyl urethanes, for example, N-allyl methylurethane to give a copolymer of vinyl acetate and N-allyl methylurethane; N-allyl n-propylurethane to give a copolymer of vinyl acetate and N-allyl n-propylurethane; N-allyl n-butylurethane to give a copolymer of vinyl acetate and N-allyl n-butylurethane, etc. On hydrolysis of any one of the copolymers of the above kind by the process of the invention, there is obtained a generally similar final product as shown in the above example.

While copolymers of N-allyl urethanes with vinyl carboxylates may be made to cover a wide range of compositions, the molecular weights of the copolymeric products decrease markedly, as the relative amounts of N-allyl urethanes are increased. When small fractions of the N-allyl urethanes are employed, as contemplated in the invention, the molecular weights of the polymers obtained are, however, sufficiently high to yield films or fibers of good mechanical properties. In such compositions sufficient amounts of amine group may be developed by the hydrolysis step, even with copolymers containing only the lower limit of 0.1 per cent by weight of allylamine, to permit hardening of the polymer by means of tanning agents such as formaldehyde ordinarily used in the curing of proteins. Thus the proportions of components in the copolymers and hydrolyzed products of the invention come within certain critical limits.

What I claim is:

1. A copolymer of from 95.0 to 99.9 percent by weight of vinyl alcohol and from 5.0 to 0.1 percent by weight of allylamine.

2. A process for preparing a copolymer of from 95.0 to 99.9 percent by weight of vinyl alcohol and from 5.0 to 0.1 percent by weight of an allylamine which comprises heating in the presence of a peroxide polymerization catalyst a mixture comprising from 95.0 to 99.9 percent by weight of a vinyl carboxylate, wherein the carboxylate group is the radical of a saturated fatty acid containing from 2 to 4 carbon atoms, and from 5.0 to 0.1 percent by weight of an N-allyl urethane having the general formula:

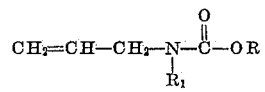

wherein R represents a member selected from the group consisting of an alkyl group containing from 1 to 4 carbon atoms, a phenyl group and a naphthyl group and $R_1$ represents a member selected from the group consisting of an atom of hydrogen, an alkyl group containing from 1 to 4 carbon atoms, a phenyl group and a naphthyl group, until the polymerization is substantially complete, treating the resultant copolymer with an alcoholic alkali metal hydroxide solution until substantially all the carboxylate groups in the copolymer are converted to hydroxyl groups, washing the partially hydrolyzed copolymer, and then subjecting it to a second hydrolysis by heating with aqueous alkali metal hydroxide until substantially all of the urethane groups are converted to amine groups.

3. A process for preparing a copolymer of from 95.0 to 99.9 percent by weight of vinyl alcohol and from 5.0 to 0.1 percent by weight of allylamine which comprises heating in the presence of a peroxide polymerization catalyst a mixture comprising from 95.0 to 99.9 percent by weight of vinyl acetate and from 5.0 to 0.1 percent by weight of N-allyl urethane, until the polymerization is substantially complete, treating the resultant copolymer with an alcoholic alkali metal hydroxide until substantially all of the acetate groups in the copolymer are converted to hydroxyl groups, washing the partially hydrolyzed copolymer, and then subjecting it to a second hydrolysis by heating with aqueous alkali metal hydroxide until substantially all of the urethane groups are converted to amine groups.

4. A process for preparing a copolymer of from 95.0 to 99.9 percent by weight of vinyl alcohol and from 5.0 to 0.1 percent by weight of allylamine which comprises heating in the presence of a peroxide polymerization catalyst a mixture comprising from 95.0 to 99.9 percent by weight of vinyl acetate and from 5.0 to 0.1 percent by weight of N-allyl methylurethane, until the polymerization is substantially complete, treating the resultant copolymer with an alcoholic alkali metal hydroxide until substantially all of the acetate groups in the copolymer are converted to hydroxyl groups, washing the partially hydrolyzed copolymer, and then subjecting it to a second hydrolysis by heating with an aqueous alkali metal hydroxide until substantially all of the urethane groups are converted to amine groups.

5. A process for preparing a copolymer of from 95.0 to 99.9 percent by weight of vinyl alcohol and from 5.0 to 0.1 percent by weight of allylamine which comprises heating in the presence of a peroxide polymerization catalyst a mixture comprising from 95.0 to 99.9 percent by weight of vinyl acetate and from 5.0 to 0.1 percent by weight of N-allyl n-propylurethane, until the polymerization is substantially complete, treating the resultant copolymer with an alcoholic alkali metal hydroxide until substantially all of the acetate groups are converted to hydroxyl groups, washing the partially hydrolyzed copolymer, and then subjecting it to a second hydrolysis by heating with an aqueous alkali metal hydroxide until substantially all of the urethane groups are converted to amine groups.

6. A process for preparing a copolymer of from 95.0 to 99.9 percent by weight of vinyl alcohol and from 5.0 to 0.1 percent by weight of allylamine which comprises heating in the presence of a peroxide polymerization catalyst a mixture comprising from 95.0 to 99.9 percent by weight of vinyl acetate and from 5.0 to 0.1 percent by weight of N-allyl n-butylurethane, until the polymerization is substantially complete, treating the resultant copolymer with an alcoholic alkali metal hydroxide until substantially all of the acetate groups are converted to hydroxyl groups, washing the partially hydrolyzed copolymer, and then subjecting it to a second hydrolysis by heating with an aqueous alkali metal hydroxide until substantially all of the urethane groups are converted to amine groups.

7. A process for preparing a copolymer of from 95.0 to 99.9 percent by weight of vinyl alcohol and from 5.0 to 0.1 percent by weight of allylamine which comprises heating in the presence of benzoyl peroxide a mixture of from 95.0 to 99.9 percent by weight of vinyl acetate and 5.0 to 0.1 percent by weight of N-allyl urethane, until the polymerization is substantially complete, treating the resultant copolymer with methanolic sodium hydroxide until substantially all of the acetate groups are converted to hydroxyl groups, washing the partially hydrolyzed copolymer, and then subjecting it to a second hydrolysis by heating with aqueous sodium hydroxide until substantially all of the urethane groups are converted to amine groups.

8. A copolymer consisting of 99 percent by weight of vinyl alcohol and 1 percent by weight of allylamine.

References Cited in the file of this patent

UNITED STATES PATENTS

| | | |
|---|---|---|
| 2,388,851 | Kenyon et al. | Nov. 13, 1945 |
| 2,456,428 | Parker | Dec. 14, 1948 |
| 2,466,404 | Fowler | Apr. 5, 1949 |
| 2,592,254 | Dickey | Apr. 8, 1952 |
| 2,598,664 | Kropa | June 3, 1952 |
| 2,606,892 | Kropa et al. | Aug. 12, 1952 |